United States Patent
Übelein et al.

(10) Patent No.: US 6,515,377 B1
(45) Date of Patent: Feb. 4, 2003

(54) CIRCUIT FOR CONTROL OF POWER WINDOWS, SUN ROOFS, OR DOOR LOCKS IN MOTOR VEHICLES

(75) Inventors: Jorg Übelein, Grub am Forst (DE); Volker Aab, Sesslach-Heiligersdorf (DE); Jürgen Seeberger, Baunach (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/596,827

(22) Filed: Jun. 19, 2000

(30) Foreign Application Priority Data

Jun. 19, 1999 (DE) .......................................... 199 28 101
Jun. 25, 1999 (WO) .............................. PCT/DE99/01900

(51) Int. Cl.⁷ ................................................ E05F 15/16
(52) U.S. Cl. ....................................... 307/10.1; 307/9.1
(58) Field of Search ................................ 307/9.1, 10.1, 307/114, 140; 701/49

(56) References Cited

U.S. PATENT DOCUMENTS

| | | | |
|---|---|---|---|
| 5,245,217 A | * 9/1993 | Honma | 307/10.1 |
| 5,574,315 A | 11/1996 | Weber | 307/10.1 |
| 5,777,395 A | * 7/1998 | Rathmann | 307/10.2 |
| 6,369,537 B1 | 4/2002 | Vordermaier et al. | |

FOREIGN PATENT DOCUMENTS

| | | | |
|---|---|---|---|
| DE | 196 31 861 | 2/1998 | |
| DE | 197 35 015 | 2/1999 | |
| EP | 0 685 356 | 12/1995 | |
| EP | 685 356 A1 | 12/1995 | |
| EP | 0 869 040 | 10/1998 | |
| EP | 0 978 401 A1 | 2/2000 | |
| EP | 0 978 402 A1 | 2/2000 | |
| EP | 1 053 897 A2 | 11/2000 | |
| EP | 1060922 A1 | * 12/2000 | ............ B60J/7/057 |
| EP | 1 053 897 A3 | 4/2002 | |
| GB | 2069587 A | * 8/1981 | ........... E05B/65/20 |
| GB | 2331328 A | * 5/1999 | ........... B60R/25/10 |
| JP | 10 322411 | 12/1998 | |
| JP | 11-93518 | * 4/1999 | ........... E05F/15/16 |

* cited by examiner

Primary Examiner—Fritz Fleming
(74) Attorney, Agent, or Firm—Christie, Parker & Hale, LLP

(57) ABSTRACT

A circuit and a process are used to control operation of an electromagnetic drive arrangement for power window lifters, sun roofs, or door locks of a motor vehicle. After recognition of a failure of functions or parts thereof or electrical or electronic components, emergency operation is initiated. The operation of electromagnetic drive arrangement is enabled by a switching element, and the control level for the control of the switching element is verified by the running of a safety routine before possible emergency operation.

18 Claims, 4 Drawing Sheets

CIRCUIT FOR CONTROL OF POWER WINDOWS, SUN ROOFS, OR DOOR LOCKS IN MOTOR VEHICLES

FIELD OF THE INVENTION

The present invention is directed to a process and a circuit for control of power windows, sun roofs, or door locks in motor vehicles with an electromechanical drive arrangement.

BACKGROUND

It is well known in the art to use bus technology in motor vehicles for data transmission between various electronically controlled devices within an automobile. Thus, for example, the individual door control devices of a door, by which the respective window lifters and the respective locks are controlled, are connected to each other and to a central electronic control module of the motor vehicle. Enabling signals, on which functions of the door control devices or the adjustable devices (window lifters, locks) are dependent, are generated by the central control module.

It has turned out that already with the failure of one part of the electrical circuit (central module or decentralized control devices) connected via the bus that important functions or even all functions of the adjustable devices can be blocked because a failed electronic circuit can no longer deliver the data which are necessary for the generation of enabling signals. Consequently, a risk to the occupants of a motor vehicle may result if the adjustable devices react incorrectly or not at all to the control commands. The situation described is thus unsatisfactory, especially since the technical operability of the adjustable devices would be present again without limitation with intact decentralized electronic circuits.

The failure of parts of the bus system, caused, for example, by water infiltration, fire, or mechanical influences (especially a crash), can lead to additional dangers especially in the event of accident-related emergency situations.

As described in EP 0 869 040 A2, a master control unit and a slave unit for a window lifter, which are connected via a "multiplex communication line", are known. With a manual power switch, an engine current for a window lifter motor can be switched to the ON position, even if an error occurs in the "multiplex communication line". However, manual power switches are very expensive and time-consuming to produce. Also, the solution presented in EP 0 869 040 A2 has the great disadvantage that the manual power switch is used only and exclusively in an emergency situation, such that operability cannot be tested until the occurrence of an emergency, and, in the event of inoperability, the manual power switch is an additional unsafe factor in an emergency since this manual power switch represents only untested redundancy for the window lifter system.

SUMMARY OF THE INVENTION

Consequently, the object of the invention is to report a circuit for the control of power window lifters, sun roofs, or door locks in motor vehicles, which improves safety in emergency operation without additional redundancy of the operating switch. Another part of the object is to report a process to improve the availability of the adjustable device through the circuit which is disrupted, for example, through a defect of a bus system communicating with the circuit or connections of the circuit, and at the same time to reduce malfunctions of the circuit.

According to the present invention, an input level of at least one connection of a power driver is defined by a logical AND-operation (a switching state) of an operating switch and a switching element. Thus, the operating switch can be used in a particularly advantageous manner both for normal operation and emergency operation without a switchover between normal operation and emergency operation being necessary. The operability and reliability of the operating switch for emergency operation is thus verifiable at all times and can already be monitored automatically by actuation in normal operation by a vehicle occupant.

The AND-operation thus only enables actuation of the power driver if the operating switch is actuated and the switching element performs the AND-operation, is specifically in the ON state. In this case, the power driver is designed such that the input level now present with the application of current to the electromechanical drive device causes an adjustment of the window lifter or the sun roof.

The switching element ensures that the actuation of the power driver can be turned on and off by a control element, for example, a door lock switch of a vehicle door. It is thus possible to prevent intentionally damaging the circuit for misuse, in particular, preventing theft of the motor vehicle by opening the window upon one actuating the operating switch.

Such disconnection of the actuation is controlled in a preferred embodiment of the invention by the circuit in that data for actuation of the switching element are verified once or a plurality of times. Thus, in an emergency situation, it is possible to effectively rule out that the AND-operation as an activated antitheft device prevents actuation of the power driver to open the window by an endangered occupant who wishes to leave the vehicle.

The power driver can be controlled in emergency operation at least by the operating switch preferably in the ON direction. Additional switches or operating switches can also permit opening the window in emergency operation in that a safety switching element, for example, or an automatic switching element is connected in parallel with the operating switch. If, for example, the operating switch fails because of a mechanical defect, the window can also be opened by another operating switch, for example, the operating switch for closing the window or the handle for opening the vehicle door.

The number of input levels is determined according to the type of power driver. For example, a coil of a relay has two connections. The AND-operation determines the potential difference of the input levels between the two connections of the coil of the relay and, thus, whether a control current is flowing through the coil. If, for example, a semiconductor bridge is used as the power controller, the individual transistors of the bridge are connected individually or in groups to a connector directly or through appropriate drivers, for example, charge pumps, and actuated with the input level.

All touch, pressure, or push switches or other switches suitable for this can be used as operating switches. Depending on the requirement of the power driver, the operating switches can be designed as low power switches or load-free potential switches, for example, capacitive switches. A semiconductor bridge is, for example, actuated at a low ohm level by a driver. If the operating switch is intended to enable the supplying of current to a relay, the inclusion of a relay current necessary to operate the relay through the operating switch, for example, a low power switch, must be guaranteed.

In one embodiment, the circuit will switch over to emergency operation adapted, for example, to the failure, based on the detection of a failure, for example, a specific error pattern. In the specification of the functions of emergency operation, i.e., which functions are still permitted, available with limits, or blocked, the risks for malfunctions according to the failure are also taken into account. This differentiated problem solving results, on the one hand, in the fact that upon the occurrence of failures in the system, a comparatively high (possibly maximized) availability of functions is provided and, on the other, in that the risk to the occupants is minimized.

In a preferred embodiment of the invention, a change in the control level of the switching element can be verified by running a safety routine in the circuit. An ARQ protocol (Automatic Request Protocol) is, for example, used as a safety routine. However, all other routines expedient for this, for example, a checksum, may be used. Because of the small amount of data of the control level, the control levels may be verified several times or with high redundancy without having to put up with significant losses in system performance, whereby the control levels transmitted are checked for errors in the safety routine.

In an alternative embodiment, a control level to control the switching element is stored in a static memory, for example, a flip-flop. Static CMOS memories, which, because of their low current consumption, can be buffered for a short-term drop in the supply voltage, are, for example, suitable as memories. Even more advantageous is the use of non-volatile memories, for example, EEPROMs, which do not lose their stored content even for a relatively long failure of the operating voltage. In addition, the switching states and error messages of the safety routine can be recorded in a log file in the EEPROM memory. A logical 1 or logical 0 of CMOS logic or other logic levels such as TTL logic levels, or a bit pattern or analog voltage levels advantageous for the control are possible as control levels.

One output of the static memory is connected with the switching element for control. If the output is directly connected with the switching element, for example, an ON-chip, the probability of errors due to electrostatic or magnetic interference is reduced. In addition, the output can be connected with the input of an element for display of the switching state. If a semiconductor bridge is used as a power driver, the memory, the switching element, and the driver for actuation of the semiconductor bridge are advantageously integrated on a semiconductor chip.

Provision may further be made that the switching element is switched on in the event of the destruction of the memory or deletion of the control level in the memory to enable emergency operation by actuation of the power driver in the open direction. For this, for example, a high ohm pull-up resistor is arranged between the gate NMOS transistor as a switching element and the operating voltage. The destruction, for example, of a non-volatile memory can be caused by high energy x-rays.

In an alternative embodiment, the control level to be stored can be checked by a control unit. For this, the control level and possible additional data to be stored by the control unit are checked for accuracy and set in relation to the type of operation, for example, emergency operation, before the control level is read into the memory, for example, by means of a storage command, a so-called latch command. Until the correct reception of the latch command, the memory retains the previously stored levels as output signals.

In a further embodiment, the memory and the control unit are linked via a serial data line with the microcontroller. The control level is transmitted via the serial data line as a connection. By means of a protocol, the accuracy of the data transmitted by the control unit and the microcontroller is verified. Thus, advantageously, the protected transmission of safety-relevant data, here at least the control level, can be guaranteed for at least a minimum period of time, and, thus, the safety-relevant functions are again made available.

The protocol permits, for a bidirectional serial data line, a request of the already transmitted data under more severe conditions, for example, infiltration of water into the vehicle door and the resultant failure of functional units, for example, a quartz as an external clock, as may occur in emergency operation. For this, the previously transmitted data of the control level is temporarily stored in a comparison memory and re-transmitted for the comparison.

For a process essential to the invention, the operation of the electromagnetic drive arrangement is released by a switching element. The release enables manual or automatic adjustment by means of the drive arrangement for a pre-specified period of time, with specific temporal delays of the turning on or switchover of the drive arrangement. For the release, external and drive-device specific parameters are advantageously evaluated by the microcontroller.

The switching state of the switching element is verified before possible emergency operation by running a safety routine. The safety routine is, in one embodiment of the invention, a program sequence programmed in the microcontroller, which queries and verifies all safety-relevant parameters of the drive arrangement and other electronic devices or electronic units or electronic components connected with the microcontroller. The safety routine is run before possible emergency operation, for example, upon unlocking of the vehicle door or starting the engine, such that the operation of the electromagnetic drive arrangement is ensured by an appropriate enabling of the drive arrangement by the switching element for emergency operation.

In a first of two preferred variants for verification, provision is made that the control level is transmitted from a microcontroller via a bidirectional serial or parallel data line to the memory and back. The control level is verified in the microcontroller, and a memory command (latch) for the storage of the control level is then transmitted to the memory by the microcontroller. In the second variant, provision is alternatively made that the control level is transmitted by a microcontroller via a data line to the memory, and the control level transmitted is verified by a control unit, which controls the storage of the verified control level in the memory. The data line is unidirectional or bidirectional in this variant.

In an advantageous improvement of the invention, a switching state of the switching element or the operating switch can be evaluated by a microcontroller for monitoring. The monitoring by the microcontroller already enables an early error analysis, which can be undertaken in a timely manner by a service technician. The switching state of the switching element or the operating switch can be defective, which also increases the risk of an emergency and impairs emergency operation to open the window.

For monitoring, the switching element or the operating switch is connected to an input of the microcontroller. In particular, the connection of the switching element or the operating switch to the power driver is also connected to the microcontroller. Thus, in a particularly advantageous manner, sticking of a contact of the operating switch or burning out of the switching element, for example, can be detected by the microcontroller.

Advantageously, a relay or a semiconductor bridge is used as a power driver. One coil current of the relay can be switched by the operating switch for actuation, by connecting the operating switch directly or via the switching element with the connection of the coil of the relay. If multiple relays are provided to supply current to the electromechanical drive arrangement, the respective connections are actuated together or with a time offset.

For a semiconductor bridge, at least one input level of the connection of the semiconductor bridge, preferably in the OPEN direction, can be switched by the operating switch. If four individual transistors to bridge are actuated individually, the so-called high-side and the low-side transistor is actuated to open the window.

For a variant of the invention, the switching element and the operating switch are arranged in a series connection as a logical AND-operation. The switching element is preferably a switching transistor, for example, a PMOS transistor, such that one coil current of a relay flows through the coils of the relay and through the switching element (PMOS transistor) and through the operating switch. For the series connection, it is not necessary for the switching element and the operating switch to be directly connected to each other. In addition, an evaluation of the coil current can enable additional analytical functions, for example, to verify the operability of the relay.

In another variant of the invention, the switching element is a switchable current source or a switchable voltage source. Thus, particularly advantageously, the safety of the control level at the connection of the power driver, in particular a semiconductor bridge, is increased. The reduction of the input level, possibly by moisture-induced parallel resistances, can be advantageously countered by the use of voltage sources. In addition, it is possible to detect parasitic parallel resistances with the help of a voltage source or current source and to minimize the risk of non-unique control levels by appropriate switchover.

In an alternative variant of the invention, the switching element is a part of a gate as a logical AND-operation. The position of the operating switch linked to the input of the gate defines an input value of the gate. Thus, particularly advantageously, a logical evaluation with a driver for relatively large output currents is permitted. Moreover, the additional linkage with other conditions can advantageously be logically evaluated. Another condition is, for example, the temporal delay of the output of the control level, which enables shutdown of the drive arrangement in the event of a change in the direction of movement.

Preferably, in emergency operation of a microcontroller every signal recognized as valid is interpreted as an emergency signal. Accordingly, the activation of any operating switch, regardless of the direction of the control command, always results in the opening of the window, preferably in automatic opening. Every lock activation always results, regardless of the direction of the control command, in the unlocking of the door or in the automatic opening of the window. An occupant locked inside the vehicle in an emergency can thus leave the vehicle since, depending on the remaining operable devices, the emergency operation automatically opens at least one emergency opening of the vehicle, i.e., a window or a vehicle door, based on an error pattern.

In another embodiment of the invention, for activation of theft protection outside emergency operation, the switching element is opened after verification. The verification, in this case, evaluates all safety-relevant parameters, whether, for example, a person is still inside the vehicle, whether a crash has occurred, and the crash sensors indicate that the activation of the theft protection is an erroneous message. Alternatively, or in addition, the data for activation are transmitted multiple times to ensure their accuracy with the necessary redundancy. Advantageously, outside of emergency operation, the theft protection is activated with the acknowledgment of all nodes of a CAN-bus which are associated with a safety function. The acknowledgment of all nodes at the time of the rundown of the CAN-bus guarantees that no node has triggered the theft protection due to crash-related malfunctions, which would mean additional danger for the occupants involved in a crash.

However, if the verification showed that it is a matter of normal parking and locking of the vehicle, the operation of the electromagnetic drive arrangement is blocked at least in the open direction, to make entry of a thief by damaging or manipulating the operating switch difficult.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

Figure 1:
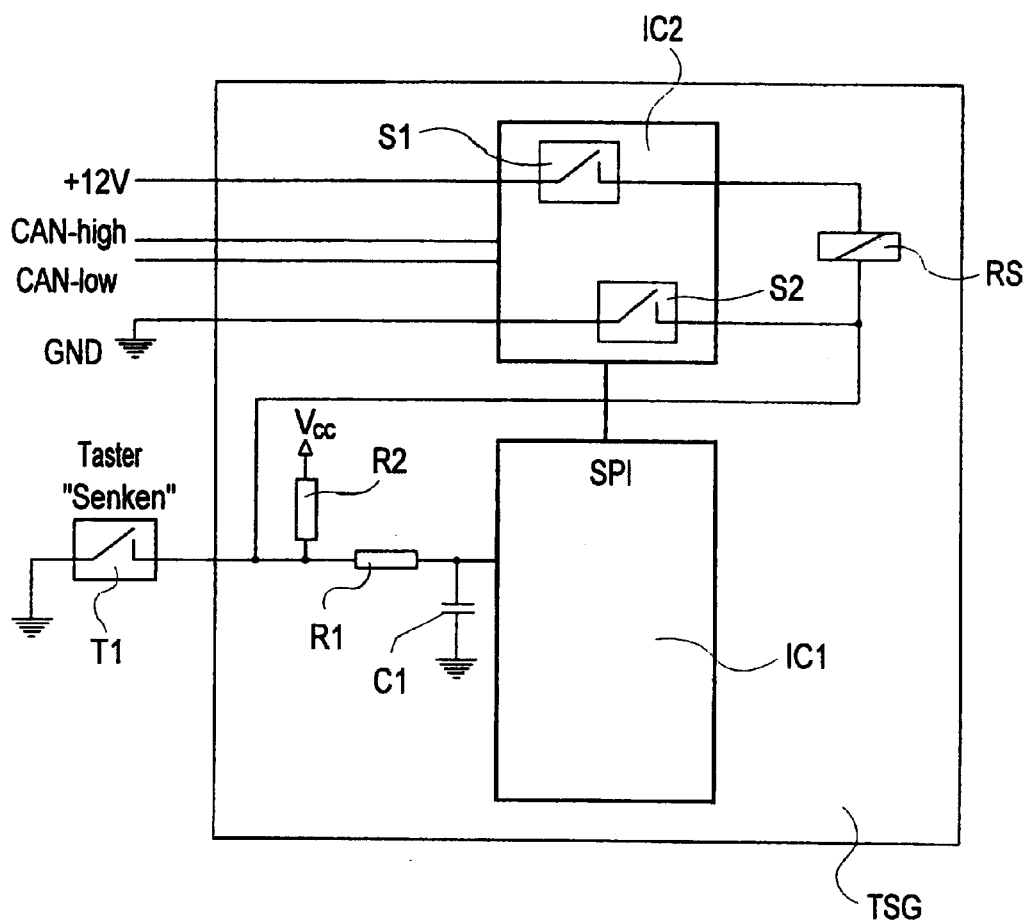
FIG. 1 is a schematic view of a circuit for a door control device according to the present invention.

The embodiment of FIG. 1 depicts a part of a circuit for a door control device TSG of a motor vehicle. According to this embodiment, a microcontroller IC1 issues the release for the function "Lower" by connection of the operating voltage (via a switching element S1) for a relay coil RS. The release is produced as a function of various enabling data which are delivered to the door control device TSG via a bus interface, for example (according to FIG. 1, this is a CAN-bus). Moreover, signals and events which result in the conclusion that an emergency situation is present (e.g., crash signal from the airbag control device) are taken into account in the generation of the release.

The relay voltage connected with the switching element S1 is not disconnected until a definitive command to block the function "Lower" is transmitted to the bus (CAN-high, CAN-low). The arrangement ensures that the enabling and blocking of the function "Lower" can occur only intentionally (through a defined serial signal, for example, via a serial interface SPI). Random input signals due to interference, e.g., moisture in the circuit, cannot result in erroneous enabling or blocking.

The direct actuation of the lowering relay RS bypassing the microcontroller IC1 is enabled only until a valid blocking command is recognized. If an emergency occurs, e.g., a bus breakdown under the influence of a crash or a control device failure as a result of water infiltration, the switching element S remains closed, i.e., the direct access to the relay coil RS of the lowering relay RS remains enabled for at least a minimal period of time. On the other hand, the function "Close window" is suitably blocked in the event of an emergency.

Also, comfort functions or even emergency functions (e.g., automatic opening of the window or actuation via key switch/radio) can be introduced by means of a microcontroller via the automatic switching element S2.

The automatic switching element S2 is linked in the broadest embodiment in a logical OR-operation with the operating switch T1, such that the relay RS can be actuated as a power driver RS in emergency operation or even outside emergency operation for comfort functions (automatic operation). In a particularly advantageous manner, in emergency operation, a defective operating switch T1 can be replaced by other control elements, in that the microcontroller IC1 recognizes the defect of the operating switch T1 and replaces it by actuation of the automatic switching element S2.

FIG. 1 depicts merely the operating switch T1 as a pushbutton for the direction "Lower". The operating switch for the direction "Open" and the associated relay are not depicted until FIG. 5 and are not shown here in FIG. 1 for the schematic depiction for the sake of clarity. The signal "Lower" is in this case generated by the pushbutton T1, in that the pushbutton T1 shorts the signal line to ground. The resistor R2 then permits evaluation of the pushbutton T1 by the microcontroller IC1 also for the case that the switching element S1 is open. The resistor R1 and the condenser C1 are used to debounce the pushbutton T1.

Figure 2:
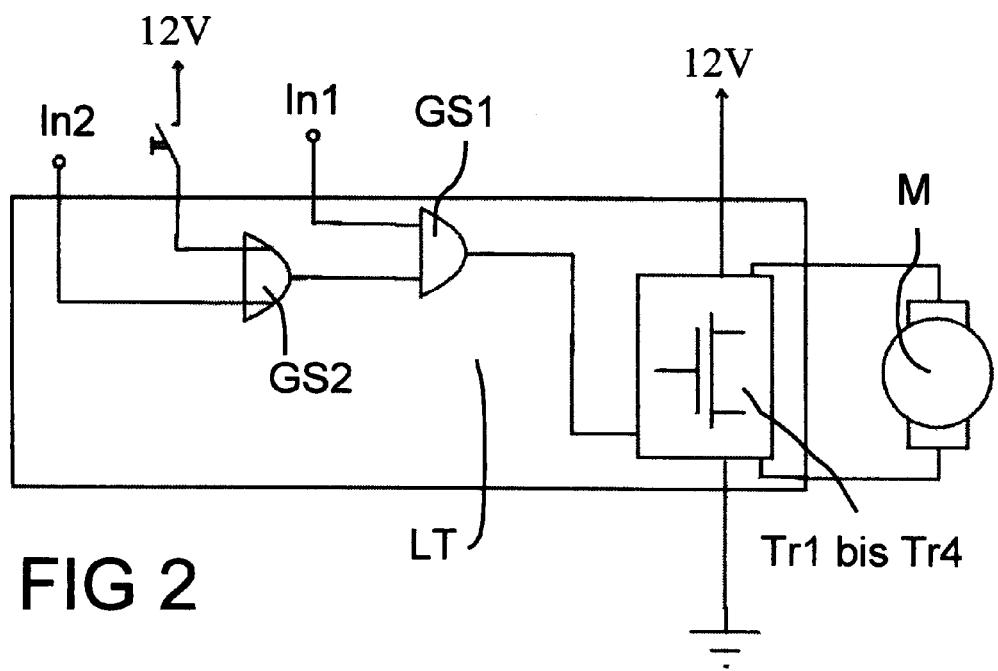
FIG. 2 is a schematic view of a part of a circuit with logic gates.

FIG. 2 depicts actuation logic integrated in the power driver LT for an electric motor M. The circuit of the actuation logic consists of the AND-gate GS1 and the OR-gate GS2. The gates may be implemented as CMOS-gates or TTL-gates. One part of the OR-gate GS2 is the automatic switching element which is controlled via the OR-input In2 from a memory. A control potential of 12 V during operation is connected through the other input via the pushbutton T1. In a particularly advantageous manner, the gates GS1, GS2 are integrated with the power transistors Tr1 through Tr4 on a smart power chip.

The output of the OR-gate GS2 is in turn connected with an input of the AND-gate GS1. The result on the output of the OR-gate is logically combined in an AND-operation with the AND-input In1. The output of the AND-gate controls, directly or via a driver (not shown in FIG. 2), a bridge out of the transistors Tr1 through Tr4 of the power driver LT for the electric motor M. The details of the bridge are not depicted in FIG. 2 for reasons of clarity. In addition to the two inputs In1 and In2, additional inputs (not shown in FIG. 2) may be included in the logical evaluation.

Figure 3:
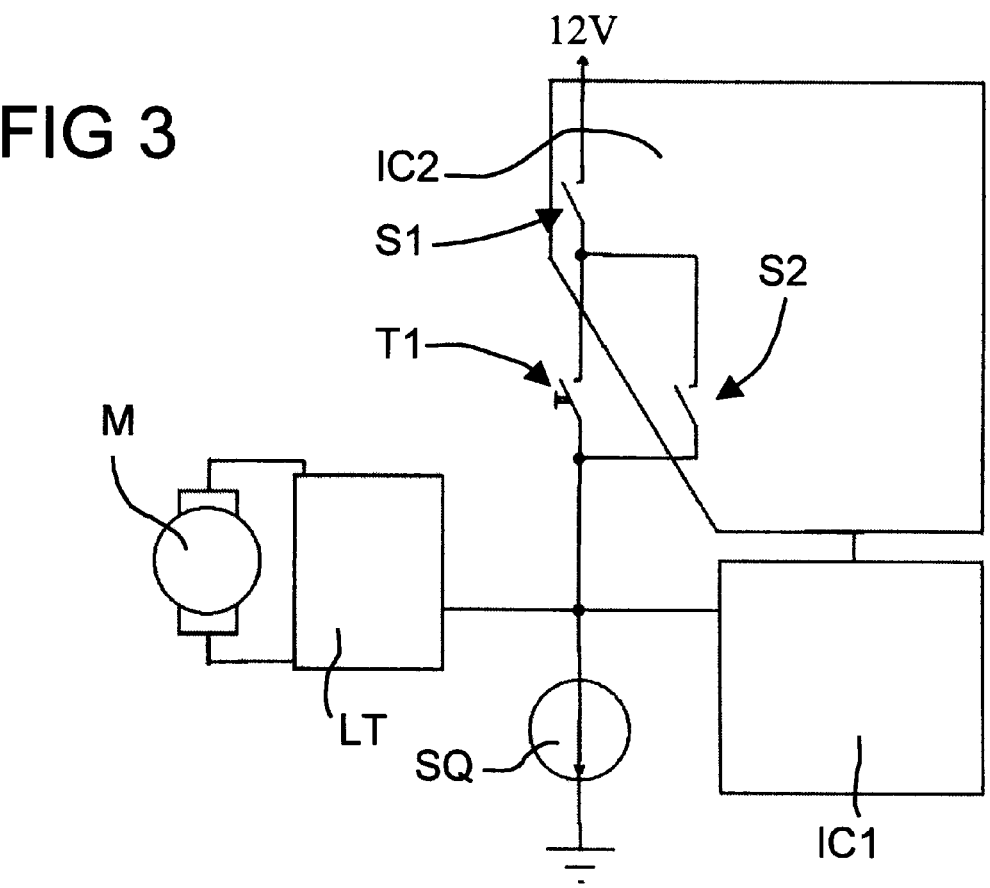
FIG. 3 is a schematic view of a circuit with a current source.

An alternative embodiment of the invention is depicted in FIG. 3. The microcontroller IC1, instead of which is also possible to implement an ASIC, controls the actuation circuit IC2 for the power driver LT. The arrangement of the switching element S1 and the automatic switching element S2 in the actuation circuit IC2 are depicted only schematically. The switching elements S1 and S2 are, for example, implemented as switching transistors. The current source SQ increases the flow of current through the switching elements S1, S2, for example, the pushbutton T1.

Thus, in a particularly advantageous manner, a defined input level or input current can be used to actuate the power driver LT. Both IC1 and IC2 depicted in FIG. 3 can be arranged on one semiconductor chip, in one housing, or in separate housings. If they are arranged in separate housings, it must guaranteed that the emergency functions do not depend on connections between the ICs, for example, copper conductor paths of a circuit board that can be affected by parasitic moisture resistance or even shorted in the case of water infiltration.

Figure 4:
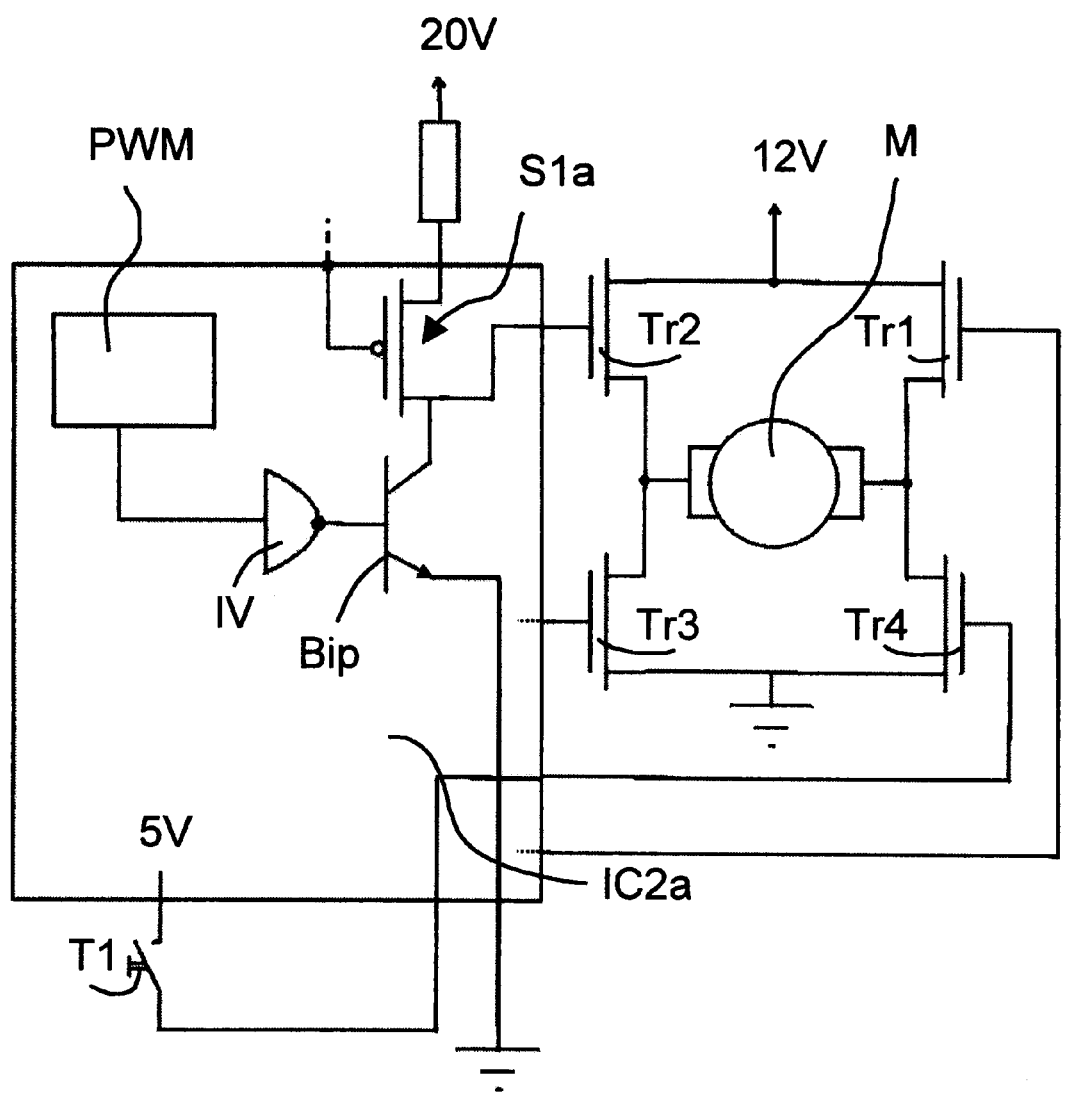
FIG. 4 is a schematic view of a circuit with a power semiconductor bridge.

FIG. 4 schematically depicts a variant of the logical AND-operation. The arrangement of the components necessary for the AND-operation are highly simplified in FIG. 4. Only the AND-operation for the function "Lower" by actuation of the associated NMOS transistors Tr2 and Tr4 of the semiconductor bridge is implemented. Since the HIGH-side transistors Tr1 and Tr2 are also NMOS transistors, these must be actuated by a higher voltage than the operating voltage of 12 V. For this, a voltage of 20 V is generated by means of charge pumps (not shown), which voltage can be connected and disconnected via the switching element S1a as an AND-operation. The input of the switching element S1a is connected (not shown in FIG. 4), for example, to an output of a microcontroller MCU.

The pushbutton T1, which actuates the LOW-side NMOS-transistor Tr4 of the semiconductor bridge, with a voltage of 5 V forms the second part of the AND-operation. Thus, the electric motor M is actuated only in the direction "Lower" when the LOW-side transistor Tr4 and the HIGH-side transistors Tr2 are actuated for the function "Lower" by the switching element S1a and also by the pushbutton T1, and the motor current flows through both power NMOS transistors Tr2 and Tr4. To enable actuation of the semiconductor bridge with a pulse width modulation PWM, the potential connected by the switching element S1a is advantageously pulsed via a transistor Bip through the PWM signal. To enable faster switching times, a bipolar transistor Bip, which is actuated via a driver or inverter IV, is advantageously used.

Figure 5:
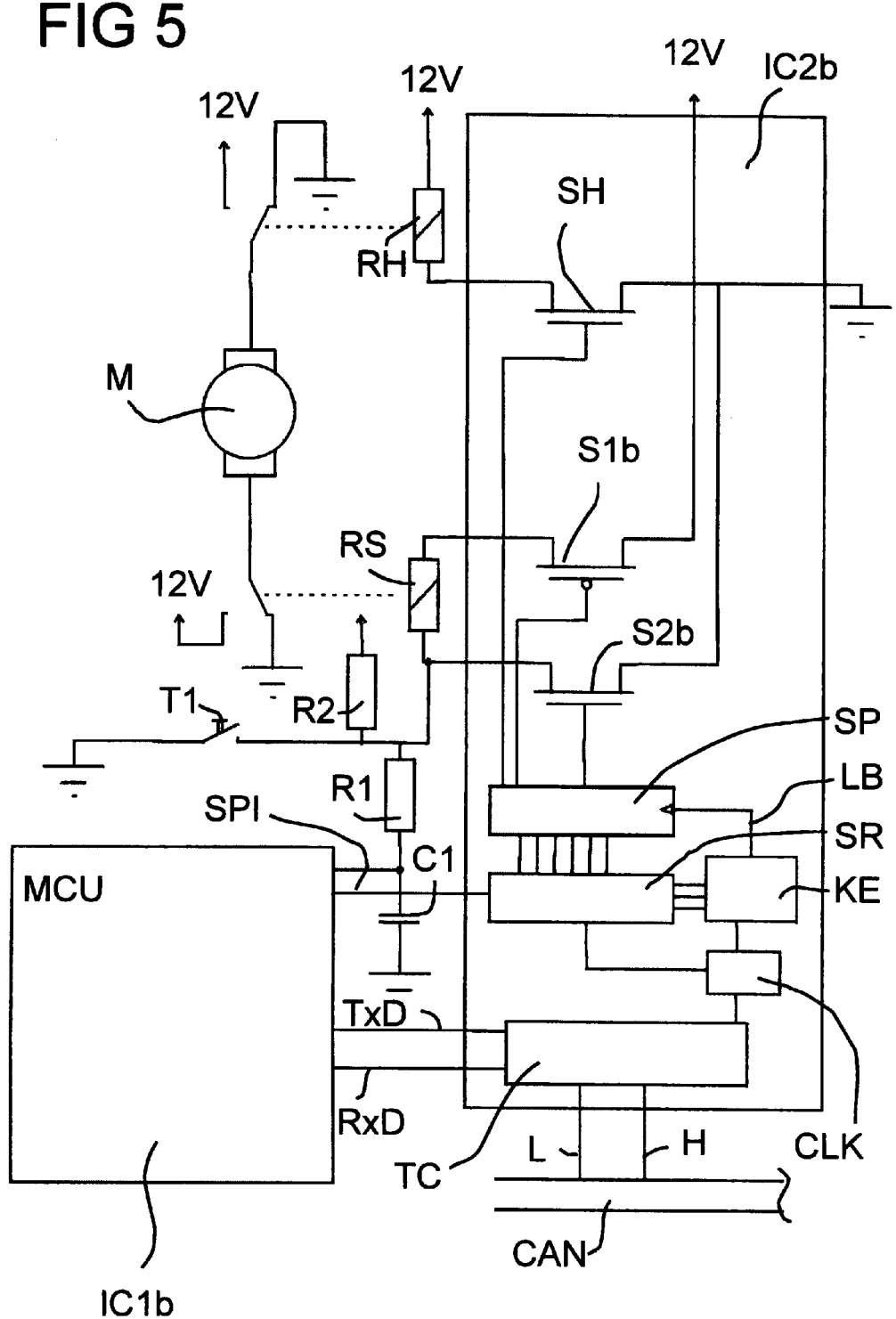
FIG. 5 is a schematic view of a circuit with an exemplary embodiment of electronic evaluation means.

FIG. 5 depicts a preferred embodiment of the invention. The electric motor M can be switched via a RAISE relay RH or via the LOWER relay RS to move a window pane. An actuation circuit IC2b includes, in addition to other electronics, a transceiver TC, which receives the signals of a CAN-bus CAN via input lines L and H and at least partially checks them. The transceiver TC is connected with a microcontroller IC1b via signal lines TxD and RxD. Via signal lines TxD and RxD as well as the transceiver TC, the microcontroller can exchange data with other circuits or electronics, for example, with a central control module of a motor vehicle.

In addition, the microcontroller IC1b is connected via a serial connection SPI with a shift register SR of the actuation circuit IC2b. The CAN-bus CAN, the signal lines TxD and RxD, or the serial connection SPI can be destroyed in an emergency situation as a result of which the microcontroller IC1b and the actuation circuit IC2b initiate emergency operation. The data transmitted into the shift register SR for the input levels of the switch transistors SH, S1b, and S2b are stored in a memory SP. The switching element S1b and the pushbutton T1 produce the AND-operation already known from FIG. 1.

Another switching element (not depicted in FIG. 5), whose additional control level is stored in the static memory SP to control the additional switching element, can be connected in parallel with the switching element S1 to increase redundancy, and the additional switching element is connected with an output of the memory SP.

The data stored in the static memory SP are transmitted via the serial data line SPI by the microcontroller IC1b to the shift register SR. For the operation of the electric motor M, the switching element S1b must be released by the control level stored in the memory SP. The control level of the switching element S1b is verified before possible emergency operation by running a safety routine. The safety routine is run in FIG. 5 in a control unit KE and the microcontroller IC1b by means of a specific program sequence which optimizes the transmission of the data via the serial data line. The safety routine enables repeated transmission of the safety-relevant data, in particular the control level for the switching element S1b. If the transmission of data occurs normally multiple times, a memory command (latch), which triggers the memory SP for storage via a command line LB, is generated by the control unit KE. To activate theft protection outside a emergency operation, the switching element S1b is opened after verification such that the operation of the electric motor M is blocked at least in the OPEN direction.

If current is provided to the electric motor in the direction "Raise", i.e., closing the window pane, an immediate switchover of the motor current into the opposite direction is undesirable, since this degrades the magnetic properties of the electric motor, since a possible permanent magnet is partially demagnetized by an immediate switchover of the motor current. To reduce this negative effect, the motor current is switched from the direction CLOSE into the direction OPEN by the operating switch T1, in that the electric motor M is switched via the microcontroller IC1b essentially without current for a minimal period of time between the closing and the opening. For this, current is simultaneously applied to the two coils of the relay RH and RS for a minimal period of time such that both connections of the electric motor M are at 12 V potential and the electric motor M is switched without current.

What is claimed is:

1. A circuit for control of power accessories in motor vehicles with an electromechanical drive arrangement and the circuit switches into an emergency operation after recognition of a failure, the circuit comprising:
    a power driver configured to supply current to the electromechanical drive arrangement;
    at least one connection to the power driver;
    an operating switch configured to be operated by a user in an emergency operation; and
    a switching element, such that the power driver can be actuated in an emergency operation, at least, via the operating switch;
    wherein the at least one connection has an input level defined by a logical AND-operation of states of the operating switch and the switching element.

2. The circuit of claim 1, further comprising a static memory having one output connected to the switching element and storing a control input level used to control the switching element.

3. The circuit of claim 2, wherein the static memory is a non-volatile memory.

4. The circuit according to claims 2 or 3, wherein the switching element is switched on to enable an emergency operation through actuation of the power driver when one of the static memory is destroyed and the control level stored in the static memory is deleted.

5. The circuit of claim 2, wherein the control input level is verifiable by a control unit.

6. The circuit of claim 5, further comprising a microcontroller, with the memory and the control unit being connected via a serial data line to the microcontroller.

7. The circuit of claim 5, further comprising a microcontroller with the control unit being at least a part of the microcontroller.

8. The circuit of claim 1, further comprising a microcontroller evaluating a switching state of one of the switching element and the operating switch, with one of the switching element and the operating switch being connected to an input of the microcontroller.

9. The circuit of claim 1, wherein the power driver is a relay, and a coil current of the relay is switched by the operating switch for actuation, such that the operating switch is connected with a connection of a coil of the relay directly or via the switching element.

10. The circuit of claim 1, wherein the power driver is a semiconductor bridge, and an output level of a connection of the semiconductor bridge is controlled by the operating switch.

11. The circuit of claim 1, wherein the switching element and the operating switch are arranged in a series connection to function as a logical AND-operation.

12. The circuit of claim 11, wherein the switching element is a switching transistor.

13. The circuit of claim 11, wherein the switching element is one of a switchable current source and a switchable voltage source.

14. The circuit of claim 1, wherein the switching element is a part of a gate to function as a logical AND-operation, and position of the operating switch connected with an input of the gate defines an input value of the gate.

15. The circuit of claim 1, wherein the power driver is configured to be actuated by a logical OR-operation of the operating switch and an automatic switching element.

16. The circuit of claim 2, further comprising:
    an additional switching element connected in parallel with the switching element; and
    an additional static memory storing an additional control level to control the additional switching element and having an output connected to the additional switching element.

17. The circuit of claim 1, further comprising:
    a microcontroller;
    wherein the electromechanical drive arrangement is switchable from a CLOSE direction to an OPEN direction by means of the operating switch, in that the drive arrangement is switched by the microcontroller without current for a minimal period of time between closing and opening.

18. The circuit of claim 1, further comprising:
    a microcontroller;
    a control unit; and
    an automatic switching element;
    wherein the switching element is connected to a supply voltage and to the power driver, the operating switch is connected to ground, to the power driver, via a pull-up resistor to the supply voltage and via a lowpass filter for debouncing, to the microcontroller, and wherein the automatic switching element is connected in parallel with the operating switch, in that the automatic switching element is connected with the ground and with the power driver, and
    the automatic switching element and the switching element are controllable by the microcontroller via a serial connection using a control level transmitted via the serial connection which is verifiable by the control unit.

* * * * *